US008920955B1

(12) United States Patent
Chuang et al.

(10) Patent No.: US 8,920,955 B1
(45) Date of Patent: Dec. 30, 2014

(54) BATTERY MODULE WITH HIGH THERMAL CONDUCTIVITY AND ASSEMBLING METHOD THEREOF

(71) Applicant: Atieva, Inc., Redwood City, CA (US)

(72) Inventors: Charles Chia-ming Chuang, Redwood City, CA (US); Benson Tsai, Redwood City, CA (US)

(73) Assignee: Atieva, Inc., Redwood City, CA (US)

( * ) Notice: Subject to any disclaimer, the term of this patent is extended or adjusted under 35 U.S.C. 154(b) by 49 days.

(21) Appl. No.: 13/714,263

(22) Filed: Dec. 13, 2012

(51) Int. Cl.
*H01M 2/10* (2006.01)
*H01M 2/20* (2006.01)

(52) U.S. Cl.
CPC ............ *H01M 2/1083* (2013.01); *H01M 2/202* (2013.01)
USPC ................................................ 429/99; 429/7

(58) Field of Classification Search
CPC ... H01M 2/204; H01M 2/105; H01M 10/425; H01M 2/206; H01M 2/22; H01M 2/1077; H01M 2/0217; H01M 2/1088
USPC ........................... 429/7, 53, 99, 159, 160, 163
See application file for complete search history.

(56) References Cited

U.S. PATENT DOCUMENTS

| 6,051,336 | A | 4/2000 | Dougherty et al. |
|---|---|---|---|
| 7,615,967 | B2 | 11/2009 | Cho et al. |
| 8,475,954 | B2 | 7/2013 | Ijaz et al. |
| 2009/0297892 | A1* | 12/2009 | Ijaz et al. ........................... 429/7 |
| 2011/0008667 | A1* | 1/2011 | Kwag et al. .................... 429/123 |
| 2011/0250488 | A1* | 10/2011 | Park .............................. 429/163 |
| 2012/0231318 | A1 | 9/2012 | Buck et al. |
| 2013/0136958 | A1* | 5/2013 | Chuang et al. ................... 429/53 |
| 2013/0302651 | A1* | 11/2013 | Kim et al. .......................... 429/7 |
| 2014/0017536 | A1* | 1/2014 | Lu et al. .......................... 429/99 |
| 2014/0030563 | A1* | 1/2014 | Hoshi et al. ..................... 429/72 |
| 2014/0065455 | A1* | 3/2014 | Chuang et al. .................. 429/71 |
| 2014/0087237 | A1* | 3/2014 | Dhar et al. ..................... 429/160 |

FOREIGN PATENT DOCUMENTS

| JP | 2007066773 | 3/2007 |
|---|---|---|
| WO | WO 2012124273 | 9/2012 |

OTHER PUBLICATIONS

Notification of Transmittal of the International Search Report and the Written Opinion of the International Searching Authority, PCT/US2013/074635, mailed Apr. 21, 2014.

\* cited by examiner

*Primary Examiner* — Stewart Fraser
(74) *Attorney, Agent, or Firm* — Womble, Carlyle, Sandridge & Rice (57) ABSTRACT

A battery module with high thermal conductivity and its assembling method are disclosed. The battery module includes multiple battery cells, a primary retaining frame, a secondary retaining frame, common electrodes and a heatsink device. The primary and second retaining frames are combined together to constitute accommodation chambers for housing the battery cells and formed with interference flanged to secure the battery cells in position. Upon being inserted into the accommodation chambers, the battery cells are electrically connected to the common electrodes. The heatsink device is then coupled to the primary retaining frame and/or the secondary retaining frame, such that the heatsink device abuts against the top common electrode and/or the bottom common electrode of the battery cells.

20 Claims, 7 Drawing Sheets

BATTERY MODULE WITH HIGH THERMAL CONDUCTIVITY AND ASSEMBLING METHOD THEREOF

FIELD OF THE INVENTION

The present invention relates to a battery module with high thermal conductivity and an assembling method thereof and, more particular, to a battery assembly structure in which multiple battery cells are arranged in a mechanically robust housing with high thermal conduction characteristics, and an assembling method thereof.

BACKGROUND OF THE INVENTION

The invention of high energy density battery technologies initiated the market of cellular phones, notebook computers, electric cars, and grid storage applications. The market demand for smaller form factor and longer operating hours pushing the battery makers to invent higher and higher energy density battery cells. Higher energy density cells require more chemically active materials and inherently less stable and more difficult to design battery systems with high safety margins.

Most high energy density battery cells are consumed in cellular phones and portable computers. Total energy required for these devices are small, and relatively few battery cells, up to 8 of the 18650 form factor, are required. Battery life expectation for consumer products is typically 1-2 years. It is relatively easy to design a safe product with only a few battery cells.

However, battery pack for electric vehicles requires a lot of battery cells. A small electric car with 21 KW-hour capacity could have a driving range of 100 Kilo-meter, and would require 3,000 of the 18650 form factor battery cells, each with 7 watt-hour capacity. By necessity these battery cells must be packaged tightly together with only millimeter spacing, and could generate about 1,000-watt heat load while in operation. Without careful thermal design, battery cell temperature could elevate up to 30 Celsius above ambient, with detrimental effect on battery cell life. Battery system for vehicle operation is often 5 years or more, thermal management is a tough design issue for vehicle applications. Furthermore, high energy density battery cells become unstable when internal temperature exceeds 80 degree Celsius. It is cell chemistry and process dependent, and the probability of thermal run away, cell venting, and fire and explosion increases dramatically beyond such safe temperature limit. Battery pack must be design to not exceed this limit under any conditions.

When one battery cell goes into thermal runaway, either through violation of safe temperature limit, manufacturing process induced cell short circuit, over charge, or external impact from vehicle crashes, the amount of energy released may cause adjacent battery cells to also go into thermal runaway, this chain reaction destroys the battery pack and place the vehicle passengers in great physical danger. Prior art battery module designs relied on forced air cooling or liquid cooling to preserve pack safety. Unfortunately, cooling is often compromised in a vehicle crash, and damaged battery cells could spark thermal runaway that leads to explosion and vehicle fire. A high thermal conductivity battery module could dissipate the thermal energy from a runaway cell, lower the probability of fire and explosion, and minimize the thermal impact to adjacent cells, and prevent the inception of a chain reaction, without relying on a working cooling system.

Battery is typically constructed by rolling a sandwich of anode/separator/cathode in a sheet form into a jelly roll for cylindrical cells with superior thermal conduction in the same direction as the conductive anode/cathode sheets. It is due to the fact that anode/cathode sheets are constructed with metal with good thermal and electrical conductivity. The positive and negative connections are brought out in either the top plane or bottom plane in the same direction as the jelly roll. In a direction perpendicular to the sheets, thermal conduction is significantly worse, because heat must traverse metal, non-conductive separator, metal, non-conductive separator, several times before reaching the outer edge. For prismatic battery cells, it is typically constructed by a flattened version of a jelly roll or an interleaved anode/separator/cathode structure that also exhibit the same characteristics in thermal conduction. For pouch cells, construction is similar to prismatic battery cells except the outer enclosure is a soft pouch.

In other words, even though the distance between the top surface and the bottom surface is greater than the one between the opposite sides, thermal conductivity for the battery cell toward its top face and bottom surface is much better than toward the lateral sidewall. A factor of 12 or more in thermal conductance difference between top/bottom surface and sidewall is found in 18650 form factor battery cells. Prior art battery modules use cooling fins or forced air convection through the sidewall of a battery as the primary heat removal mechanism. It is hindered by the poor thermal conductivity of the cell sidewall and not effective in heat removal. Furthermore, cooling air is warmed as it blows across cells, and the battery cell at the end, closest to the air outlet, has the highest air temperature. Every 10 degrees Celsius higher cell temperature halves the battery operating life, prior art battery pack design often cannot meet operating life requirement without stipulating a cooler air inlet temperature than ambient temperature. Other prior art battery module tries to remove heat from the top/bottom surface of battery cells without a mechanically robust connection. Under high shock and vibration vehicle operation, thermal connection from the top/bottom surface of battery cells to external heat sinks can be broken. Because air is a very good thermal insulator, air gap of 0.1 mm is sufficient to stop the transfer of heat away from the battery cell. If battery cell to mechanical housing design is not robust, cell wall can rub against housing under high shock and vibration vehicle operation and sustain damages. Physically damaged cell will lead to shorter operation life. Physically damaged cells can leak flammable electrolyte into the battery pack, creating a fire hazard. Physically damaged cell can also lead to thermal runaway.

18650 type battery cells have electrodes in opposite ends. Many pouch cell designs also have electrodes in opposite ends. Cells must be connected in series in order to meet the voltage requirement of vehicle applications. Typical requirement of 360-volt system can be met by placing 100 of 3.6-volt cells in series. A battery module design that brings the two electrodes into the same plane facilitates inter-module connection in production and field replacement. Furthermore, a battery module design that allows for serial connection within the module is even better.

Therefore, there is a need for a reliable battery module, in which battery cells are mounted in a mechanically robust manner to prevent cell damage or rupture from vehicle shock and vibration, and have improved heat dissipation capability to prolong operating life, and have high safety factor of preventing battery pack from thermal runaway chain reaction in a vehicle crash. Advantageously, the battery modules can be easily installed and maintained in production or in field repairs.

SUMMARY OF THE INVENTION

Accordingly, an objective of the present invention is to provide a battery module with high thermal conductivity, in which battery cells are mounted in a mechanically robust manner to prevent cell damage or rupture from vehicle shock and vibration.

Another objective of the present invention is to provide a battery module with high thermal conductivity with improved heat dissipation capability, thereby prolonging the service life of the battery cells and minimizing the possibility of thermal event or explosion.

Another objective of the present invention is to provide a battery module with high thermal conductivity, whose interconnection design is advantageous in facilitating the production and field replacement of battery cells.

Another objective of the present invention is to provide a method for assembling a battery module with high thermal conductivity in which battery cells are mounted in a mechanically robust manner to prevent cell damage or rupture from vehicle shock and vibration.

A yet still another objective of the present invention is to provide a method for assembling a battery module with high thermal conductivity with improved heat dissipation capability, thereby prolonging the service life of the battery cells and minimizing the possibility of thermal event or explosion.

Therefore, the invention provides a method for assembling a battery module with high thermal conductivity. The battery module is provided with multiple battery cells, each comprising a top surface with a metal region served as a top electrode, a bottom surface with a metal region served as a bottom electrode, and a sidewall connecting the top surface to the bottom surface. The top and bottom electrodes are electrically insulated from each other. The assembling method comprises the steps of:

a) providing a primary retaining frame and a secondary retaining frame that together define a plurality of accommodation chambers for housing the respective battery cells, and inserting the respective battery cells into the accommodation chambers corresponding thereto; and b) electrically connecting the top electrodes and bottom electrodes to a top common electrode or a bottom common electrode respectively, and coupling a heatsink device to the primary retaining frame and/or the secondary retaining frame, such that the heatsink device abuts against the top common electrode and/or the bottom common electrode of the battery cells.

The invention further provides a battery module with high thermal conductivity. The battery module comprises:

a plurality of battery cells, each comprising a top surface with a metal region served as a top electrode, a bottom surface with a metal region served as a bottom electrode, and a sidewall connecting the top surface to the bottom surface, with the top and bottom electrodes being electrically insulated from each other;

a primary retaining frame formed with a plurality of retaining holes;

a secondary retaining frame formed with a plurality of accommodation holes, each corresponding to one of the retaining holes, the respective retaining holes being registered with the respective accommodation holes corresponding thereto to constitute a plurality of accommodation chambers;

a top common electrode and a bottom common electrode electrically connected to the top electrodes and the bottom electrodes, respectively; and a heatsink device coupled to the primary retaining frame and/or the secondary retaining frame, such that the heatsink device abuts against the top common electrode and/or the bottom common electrode of the battery cells.

In the battery module disclosed herein, the battery cells are enclosed within the accommodation chambers and electrically connected to the top and bottom common electrodes. The retaining holes and accommodation holes are formed with one or more interference flanges for holding the battery cells within the accommodation chambers. A heatsink device is coupled to the primary retaining frame and/or the secondary retaining frame. Advantageously, the heatsink device abuts against the top common electrode and/or the bottom common electrode of the battery cells. By virtue of the arrangement disclosed herein, the electrical connection among the battery cells will not be adversely affected by severe shock or vibration, thereby preventing the occurrence of accidental cell damage or short circuit and increasing battery pack safety during operation. The tight interference fit also assures good thermal conduction path from battery cells to heatsink even at severe shock and vibration conditions.

During maintenance, the technicians can simply replace the battery modules which contain damaged or low capacity battery cells with functional battery modules. Manpower needed for maintenance works is thus reduced considerably. The invention achieves the objects described above accordingly.

BRIEF DESCRIPTION OF THE DRAWINGS

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
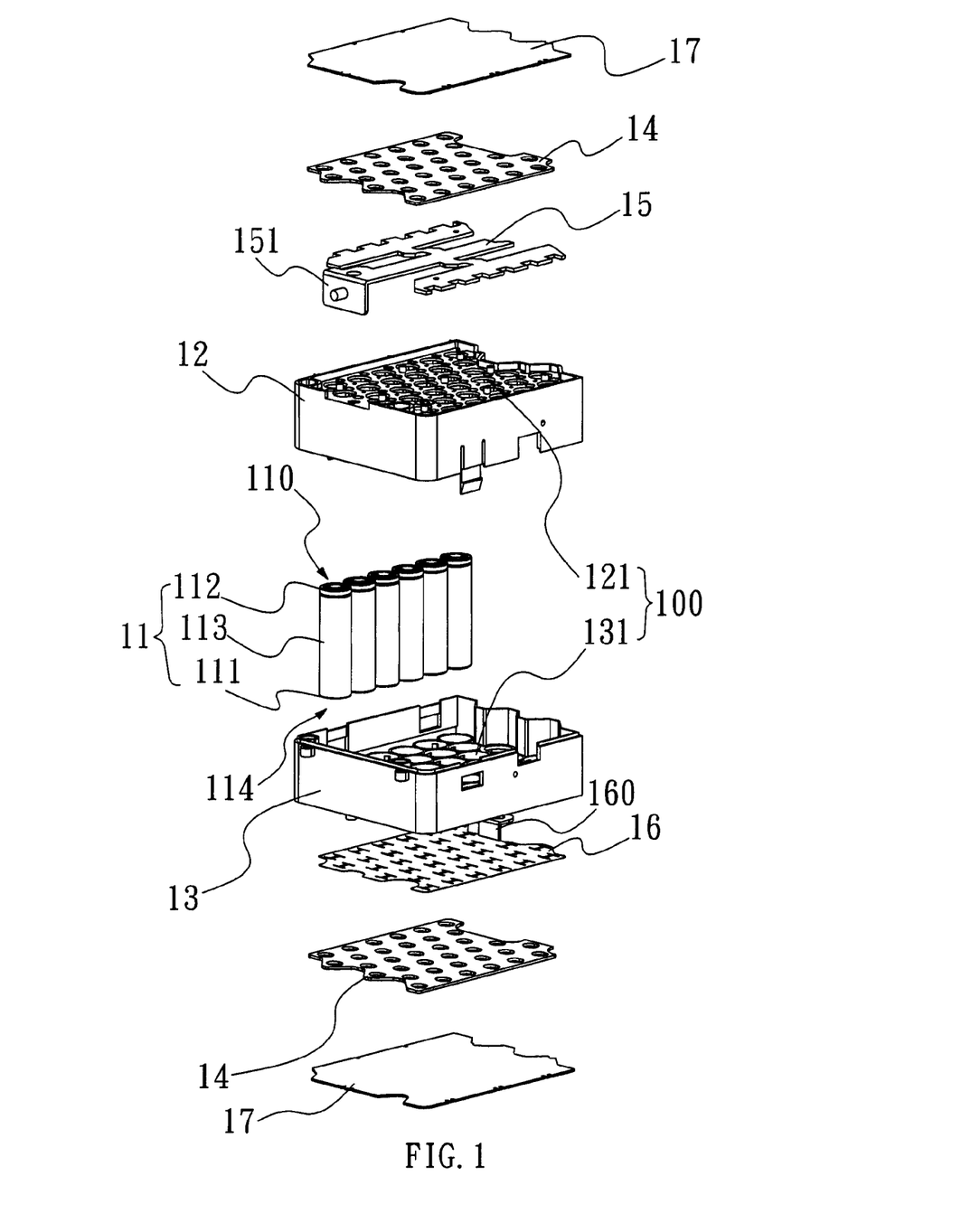
FIG. 1 is an exploded schematic view of the battery module with high thermal conductivity according to the first preferred embodiment of the invention.
Figure 2:
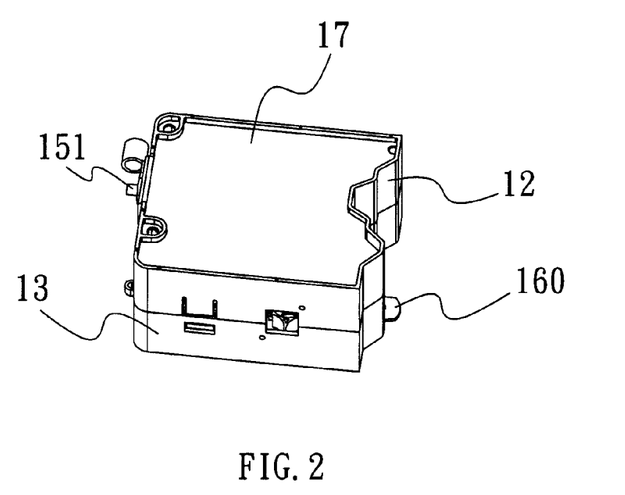
FIG. 2 is a schematic perspective view of the battery module of FIG. 1.

FIG. 1 and FIG. 2 show the battery module with high thermal conductivity according to the first preferred embodiment of the invention, which includes multiple battery cells 11, a primary retaining frame 12, a secondary retaining frame 13, a common electrode and a heatsink device. The common electrode is divided into a top common electrode 15 and a bottom common electrode 16. Each of the battery cells 11 has a bottom surface 111, a top surface 112 and a sidewall 113 connecting the bottom surface 111 to the top surface 112. The respective top surfaces 112 of the battery cells 11 each have a metal region as battery cell positive electrode 110, while the respective bottom surfaces 111 each have a metal region as battery cell negative electrode 114, both electrodes being of sealed configurations. According to this embodiment, the heatsink device, as illustrated, includes a thermal conductive pad 14 made of resilient material, such as rubber and silicone material. During the manufacturing process, the resilient material is doped with carbon powder or metallic powder to enhance thermal conductivity.

Figure 3:
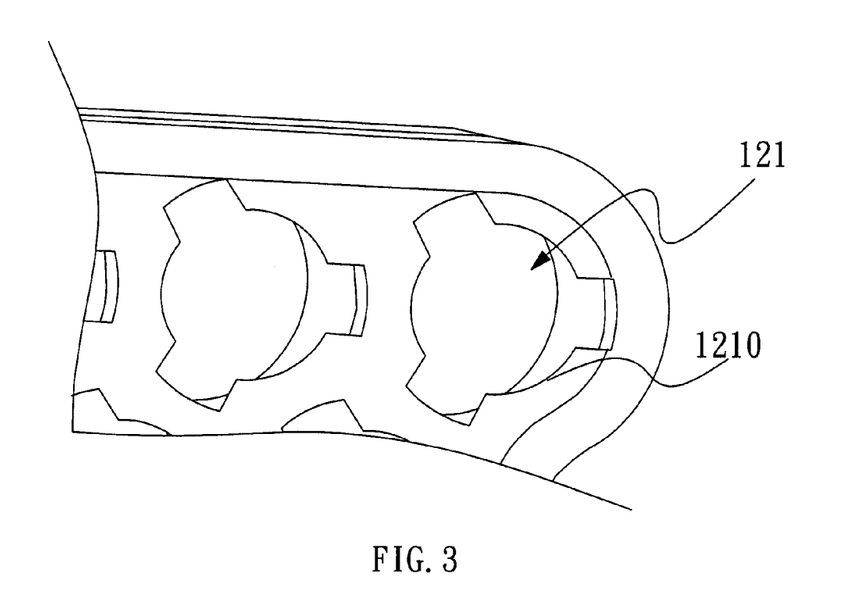
FIG. 3 is a schematic perspective diagram showing that the primary retaining frame of the battery module of FIG. 1 is formed with multiple interference flanges.
Figure 4:
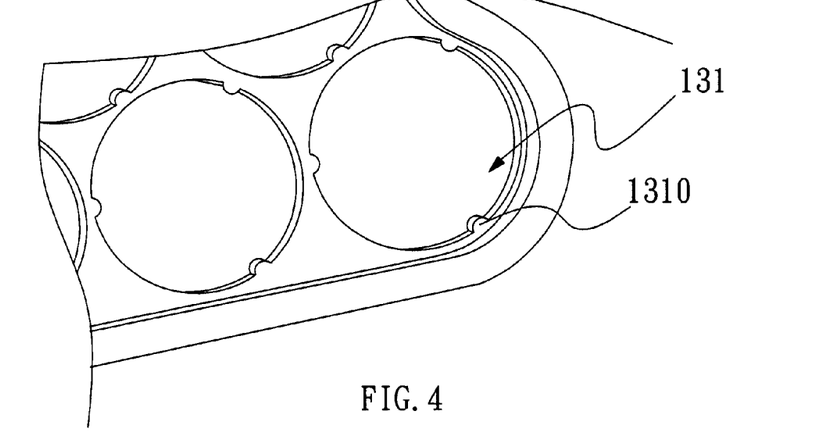
FIG. 4 is a schematic perspective diagram showing that the secondary retaining frame of the battery module of FIG. 1 is formed with multiple interference flanges.

According to this embodiment, the primary retaining frame 12 and the secondary retaining frame 13 are made by plastic injection molding means. The primary retaining frame 12 is molded to include a plurality of retaining holes 121, each corresponding to an accommodation hole 131 formed on the secondary retaining frame 13. Referring to FIGS. 3 and 4, the retaining holes 121 and the accommodation holes 131 are individually accompanied with three interference flanges 1210, 1310, and the interference flanges 1210, 1310 are plastic protrusions formed during the molding of the primary retaining frame 12 and the secondary retaining frame 13. The number of the interference flanges 1210, 1310 may vary depending upon the actual need. When a battery cell is inserted into an accommodation hole, the interference flanges forms a tight hold onto the sidewall of the battery cell. Adhesive glues can also be injected into the accommodation cavity via openings beside the interference flanges after the battery cells have been inserted to enhance shock and vibration resistance.

Figure 5:
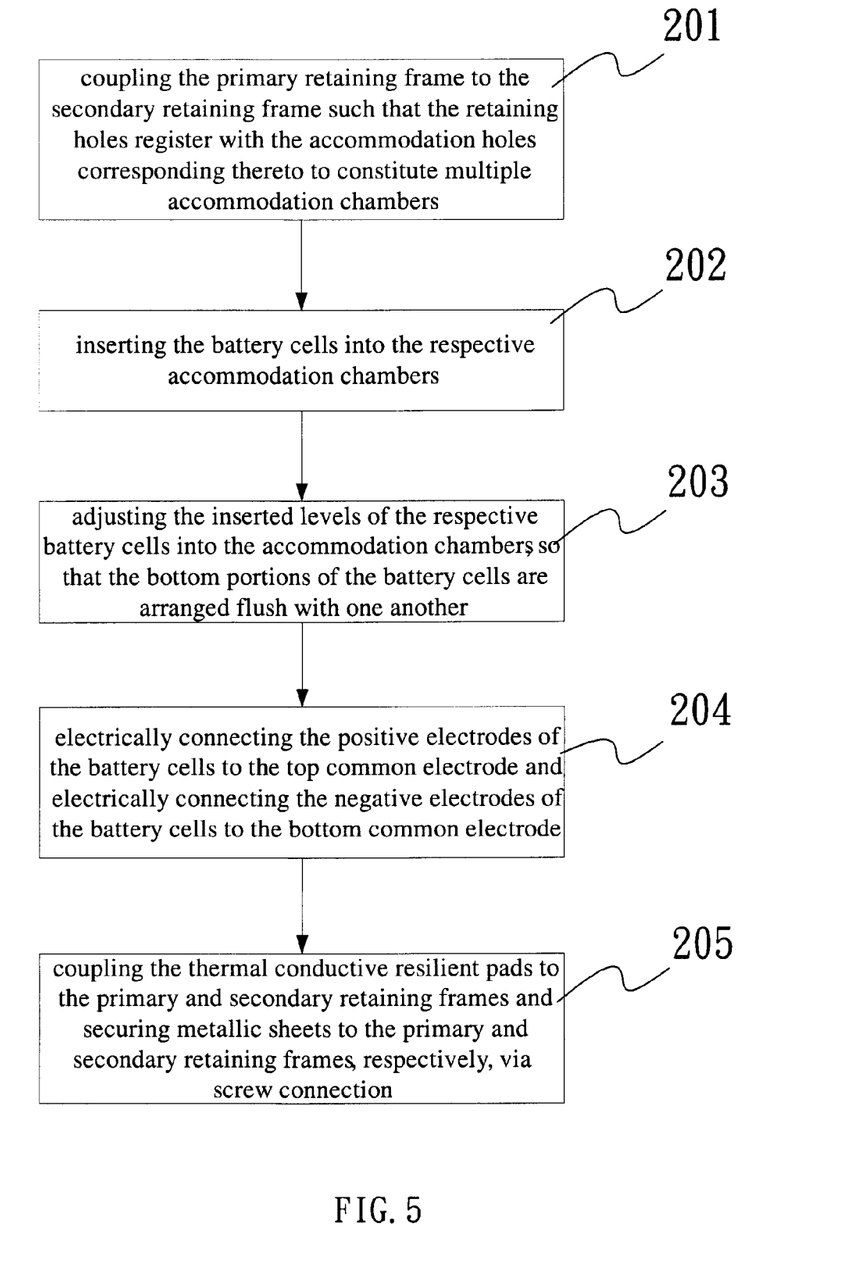
FIG. 5 is a flowchart for assembling the battery module with high thermal conductivity according to the first preferred embodiment of the invention.

FIG. 5 shows an exemplary flowchart for assembling the battery module with high thermal conductivity according to the first preferred embodiment of the invention. In an initial Step 201, the primary retaining frame 12 is coupled to the secondary retaining frame 13 in such a manner that the respective retaining holes 121 register with the respective accommodation holes 131 corresponding thereto to constitute multiple accommodation chambers 100. In Step 202, the respective battery cells 11 are inserted into the respective accommodation chambers 100. Since the retaining holes 121 and the accommodation holes 131 are individually formed with the interference flanges 1210, 1310, each battery cell, upon being inserted into the accommodation chamber 100 corresponding thereto, is firmly held within the accommodation chamber 100 due to the engagement of the interference flanges 1210, 1310 with the portions of the battery cell sidewall 113.

Next, in Step 203, the battery cells 11 inserted within the accommodation chambers 100 are arranged flush with one another by placing the bottom surfaces 111 of the battery cells 11 on a flat surface and equalizing the inserted positions of the respective battery cells 11 into the accommodation chambers 100. As an alternative, the battery cells 11 are similarly arranged flush with one another by adjusting the respective top surfaces 112 of the battery cells 11. In Step 204, the respective battery cells 11 are individually electrically connected via their positive top electrodes 110 to the top common electrode 15. The top common electrode 15 includes a positive terminal 151 protruding beyond an edge of the primary retaining frame 12. Similarly, the respective battery cells 11 are individually electrically connected to the bottom common electrode 16 via the negative bottom electrodes 114, and the bottom common electrode 16 includes a negative terminal 160 protruding beyond an edge of the secondary retaining frame 13. Electrical connections can be made by soldering, ultrasonic welding, or resistive welding. Heavy braid wires or metal strips can be used as connecting material to minimize electrical resistance as well as thermal resistance.

Figure 6:
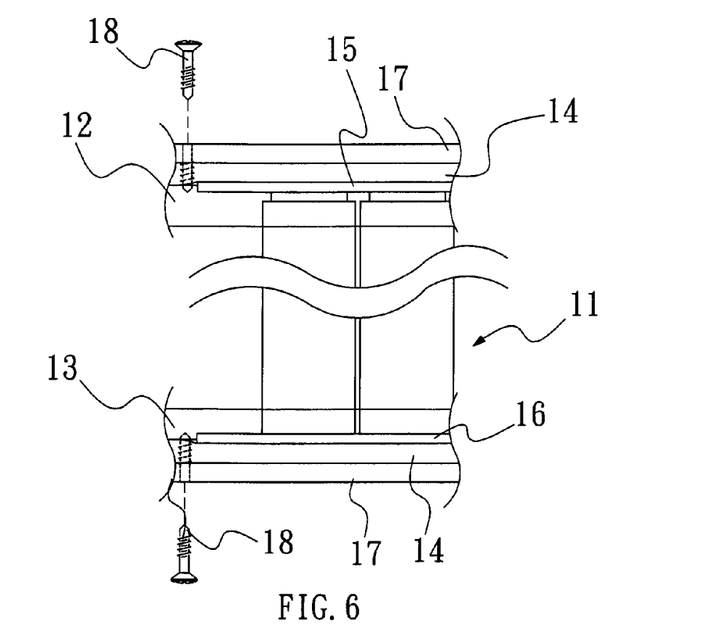
FIG. 6 is a cross-sectional view showing the assembling of the battery module of FIG. 1.

Finally, in Step 205, the upper and lower thermal conductive resilient pads 14 are pressed towards the primary retaining frame 12 and the secondary retaining frame 13 by a metallic sheet 17, respectively, as shown in FIG. 6. The respective metallic sheets 17 are then secured to the primary retaining frame 12 and the secondary retaining frame 13 via fasteners 18. Since the respective thermal conductive resilient pads 14 are intimately sandwiched between the metallic sheet 17 and the top or bottom common electrode 15, 16, the heat generated by the battery cells 11 can be effectively dissipated via their top and bottom surfaces 111, 112 to the metallic sheets 17 and then to the ambient. Fins can be formed on the metallic sheet to aid in heat dissipation. Thermal interfacial material can also be added in between thermal conductive resilient pads and the common electrodes to enhance thermal contact conductance.

Figure 7:
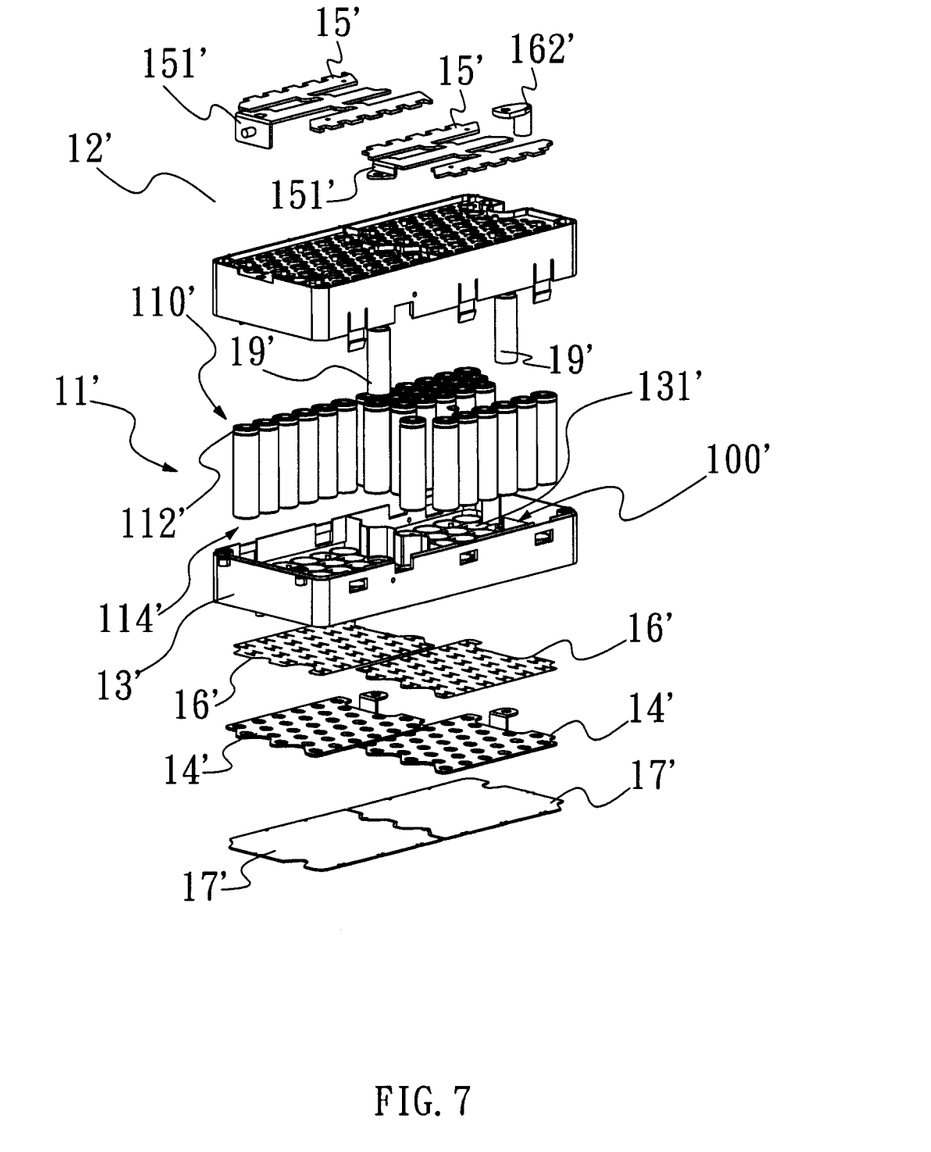
FIG. 7 is an exploded schematic view of the battery module with high thermal conductivity according to the second preferred embodiment of the invention.
Figure 8:
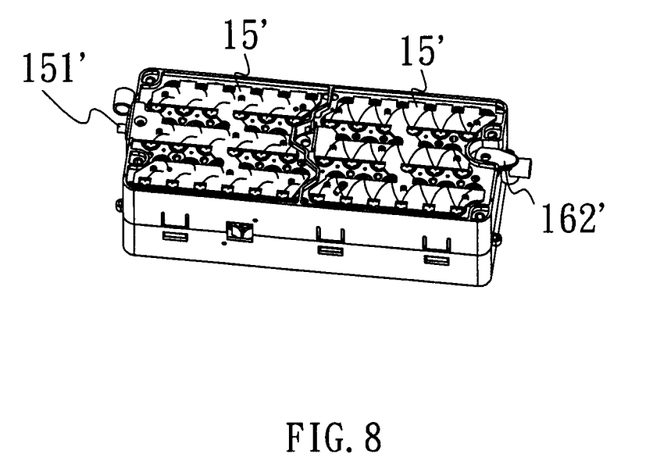
FIG. 8 is a schematic perspective view of the battery module of FIG. 7.

FIGS. 7 and 8 illustrate the battery module with high thermal conductivity according to the second preferred embodiment of the invention. In this embodiment, two battery modules, each being provided with a conductive pillar 19', are combined together. The size of conductive pillar 19' is equal or less than that of a battery cell 11. While the conductive pillar 19' is made of copper in this embodiment, other electrically conductive material, including but being not limited to aluminum, silver, stainless steel and an alloy thereof, can be employed according to the invention.

Figure 9:
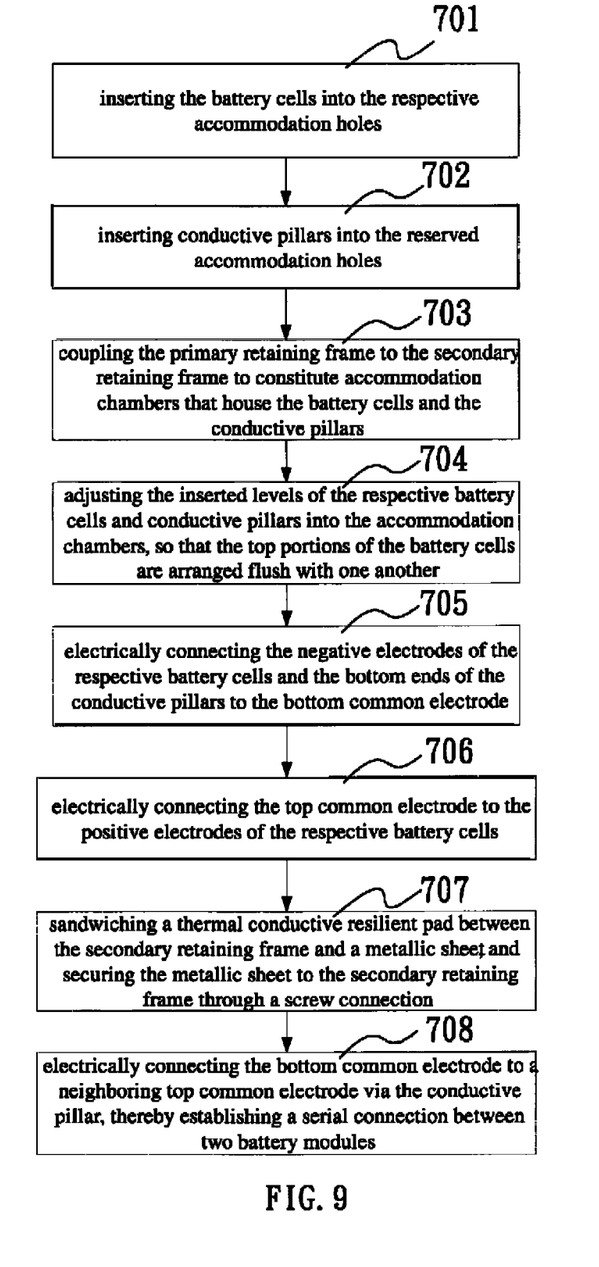
FIG. 9 is a flowchart for assembling the battery module with high thermal conductivity according to the second preferred embodiment of the invention.

FIG. 9 shows an exemplary flowchart for assembling the battery module with high thermal conductivity according to the second preferred embodiment of the invention. In an initial Step 701, the respective battery cells 11' are inserted into the corresponding accommodation holes 131' of the secondary retaining frame 13' and two accommodation holes 131' are reserved for the conductive pillars 19'. In Step 702, two conductive pillars 19' are inserted into the reserved accommodation holes 131'. In Step 703, the primary retaining frame 12' is coupled to the secondary retaining frame 13' that has been mounted with the battery cells 11' and the conductive pillars 19', so as to constitute a plurality of accommodation chambers 100' that house the battery cells 11' and the conductive pillars 19'. In Step 704, the battery cells 11' and the conductive pillars 19' inserted within the accommodation chambers 100' are arranged flush with one another by placing the top surfaces 112' of the battery cells 11' and top ends of the conductive pillars 19' on a flat surface and equalizing the inserted levels of the respective battery cells 11 and the respective conductive pillars 19' into the accommodation chambers 100'.

In Step 705, the negative bottom electrodes 114' of the respective battery cells 11', as well as the bottom ends of the respective conductive pillars 19', are electrically connected to the bottom common electrode 16'. In Step 706, the top common electrode 15' is electrically connected to the positive top electrodes 110' of the respective battery cells 11' and arranged to be electrically insulated from the conductive pillars 19'. In Step 707, a thermal conductive resilient pad 14' is sandwiched between the secondary retaining frame 13' and a metallic sheet 17' and secured to the secondary retaining frame 13' through a fastener connection of the metallic sheet 17' to the secondary retaining frame 13', so that the thermal conductive resilient pad 14' is forcedly deformed by pressurization and in turn abuts against the bottom common electrode 16' and the metallic sheet 17'. For the purpose of clarity, a single resilient pad 14' is illustrated in this embodiment.

It is apparent to those skilled in the art that the battery cells can be electrically connected to the top common electrode 15' and the bottom common electrode 16' by alternative processes. As illustrated, in the battery module shown at the left side of FIG. 8, the positive electrode of each battery cell is welded to an end of a conductive wire and the opposite end of the conductive wire is welded to the top common electrode 15'. As an alternative example, in the battery module shown at the right side of FIG. 8, a single conductive wire is arranged in a zigzag form to electrically connect a row of battery cells to the top common electrode 15' by ultrasonic welding. The zigzag process eliminates a wire cutting and a reposition process steps and can speed up the production rate by a factor of two. The respective negative electrodes can be electrically connected to the bottom common electrode 16' in like manner. In addition, the positive electrodes of the battery cells can be electrically connected to the top common electrode 15' before or after the electrical connection of the negative electrodes to the bottom common electrode 16', and the order of process is not important under the spirit of the invention.

In the final Step 708, the bottom common electrode 16' of the battery module is electrically connected via the conductive pillar 19' to the positive terminal 151' of the top common electrode 15' in the neighboring battery module, thereby establishing a serial connection between the two battery modules. In the arrangement described herein, the voltage output is increased due to the serial connection of the two battery modules. Meanwhile, the conductive pillar 19' of the neighboring battery module is provided with a conductive connector 162' and serves as a negative terminal of the assembly. While two battery modules are combined for the purpose of illustration in this embodiment, the assembly can be expanded by serial connection to additional battery module(s), depending on the voltage output required.

External connections can be rearranged to achieve a parallel connection of two neighboring battery modules. In this case, the top common electrodes 15' of the two neighboring battery modules are electrically connected to each other and the conductive pillars 19' are electrically connected to each other. In addition, fuse elements (not shown) may be coupled between the battery cells 11' and the top common electrodes 15' to provide protection for over-current, in order to improve operation safety.

According to the invention, during the injection molding of the primary and secondary retaining frames of the battery module with high thermal conductivity disclosed herein, one or more interference flanges are formed in such a manner that they extend inwardly from the peripheries of the respective retaining holes and the respective accommodation holes towards the centers of the holes. Therefore, upon being inserted into the accommodation holes, the battery cells are abutted against and held in position by the interference flanges. A conductive pillar can also be made to have interference fit with the same interference flanges. Moreover, a heatsink device is brought in contact with the top common electrode and/or the bottom common electrode, so as to permit heat to rapidly dissipate from the battery cells via two ends thereof, thereby minimizing the possibility of thermal event or explosion. Advantageously, the heatsink device comprises a thermal conductive resilient pad made of impact-absorbing material. The battery pack disclosed herein is composed of multiple battery modules connected in series or in parallel with one another and the respective battery modules can be easily dissembled and reassembled. During maintenance, the technician can simply replace failed battery modules with functional battery modules. Manpower needed for maintenance works is thus reduced considerably. The invention achieves the objects described above accordingly.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A method for assembling a battery module with high thermal conductivity, the battery module having multiple battery cells, each comprising a top surface with a metal region served as a top electrode, a bottom surface with a metal region served as a bottom electrode, and a sidewall connecting the top surface to the bottom surface, with the top and bottom electrodes being electrically insulated from each other, the assembling method comprising the steps of:
   a) providing a primary retaining frame having a plurality of retaining holes, and a secondary retaining frame having a plurality of accommodation holes, that together define a plurality of accommodation chambers for housing the respective battery cells, each of the plurality of accommodation chambers housing a solitary respective battery cell, and inserting the respective battery cells into the accommodation chambers corresponding thereto; and
   b) electrically connecting the top electrodes and bottom electrodes to a top common electrode or a bottom common electrode, respectively, and coupling a heatsink device to the primary retaining frame and/or the secondary retaining frame, such that the heatsink device abuts against the top common electrode and/or the bottom common electrode of the battery cells.

2. The method for assembling a battery module with high thermal conductivity according to claim 1, wherein the battery cells are of a volume less than that of the accommodation chambers, and wherein the step a) further comprises a sub-step a2) of providing at least one conductive pillar having a volume not larger than one of the battery cells, inserting at least one conductive pillar into one of the accommodation chambers which is not occupied by battery cells, and electrically connecting a first end of the at least one conductive pillar to one of the top common electrode and the bottom common electrode while making the at least one conductive pillar electrically insulated from the other of the top common electrode and the bottom common electrode, such that a second end of the at least one conductive pillar is exposed.

3. The method for assembling a battery module with high thermal conductivity according to claim 1, wherein the step a) further comprises a sub-step a1) of adjusting the position of battery cells with respect to the accommodation chambers to which the respective battery cells are inserted, so that the top surfaces or the bottom surfaces of the battery cells are aligned on a same plane.

4. The method for assembling a battery module with high thermal conductivity according to claim 1, wherein the step b) further comprises the sub-steps of:
   b1) electrically connecting the bottom electrodes of the respective battery cells to a bottom common electrode;

b2) coupling the heatsink device to the secondary retaining frame, such that the heatsink device abuts against the common bottom electrode; and b3) electrically connecting the top electrodes of the respective battery cells to a top common electrode.

5. The method for assembling a battery module with high thermal conductivity according to claim 4, wherein the heatsink device comprises a resilient pad with high thermal conductivity, and wherein the sub-step b2) comprises using multiple fasteners to secure the resilient pad, the primary retaining frame, the secondary retaining frame and the battery common electrodes together.

6. The method for assembling a battery module with high thermal conductivity according to claim 1, further comprising:

applying thermal interfacial material to at least one of: the heatsink device or a metallic sheet; and assembling the metallic sheet to the secondary retaining frame, with the heatsink device between the metallic sheet and the bottom common electrode.

7. The method for assembling a battery module with high thermal conductivity according to claim 1, further comprising:

deforming the heatsink device; and securing a metallic sheet to the secondary retaining frame, with the heatsink device between the metallic sheet and the secondary retaining frame.

8. The method for assembling a battery module with high thermal conductivity according to claim 1, wherein the heatsink device includes a resilient, thermally conductive pad having at least one of: rubber, silicone, carbon powder, or metallic powder.

9. A battery module with high thermal conductivity, comprising:

a plurality of battery cells, each comprising a top surface with a metal region served as a top electrode, a bottom surface with a metal region served as a bottom electrode, and a sidewall connecting the top surface to the bottom surface, with the top and bottom electrodes being electrically insulated from each other;

a primary retaining frame formed with a plurality of retaining holes;

a secondary retaining frame formed with a plurality of accommodation holes, each corresponding to one of the retaining holes, the respective retaining holes being registered with the respective accommodation holes corresponding thereto to constitute a plurality of accommodation chambers;

a top common electrode and a bottom common electrode electrically connected to the top electrodes and the bottom electrodes, respectively; and a heatsink device coupled to the primary retaining frame and/or the secondary retaining frame, such that the heatsink device abuts against the top common electrode and/or the bottom common electrode.

10. The battery module with high thermal conductivity according to claim 9, further comprising at least one conductive pillar having a volume not larger than one of the battery cells, wherein the battery cells are of a volume less than that of the accommodation chambers and the at least one conductive pillar are inserted in accommodation chambers which is not occupied by battery cells, and wherein the at least one conductive pillar includes a first end electrically connected to one of the top common electrode and the bottom common electrode, and wherein the at least one conductive pillar is electrically insulated from the other of the top common electrode and the bottom common electrode, such that a second end of the at least one conductive pillar is exposed.

11. The battery module with high thermal conductivity according to claim 9, wherein the primary retaining frame and/or the secondary retaining frame are formed with interference flanges extending towards the respective retaining holes and/or the respective accommodation holes, so that the interference flanges tightly hold the sidewalls of the battery cells to secure the battery cells within the accommodation holes.

12. The battery module with high thermal conductivity according to claim 11, wherein the primary retaining frame and the secondary retaining frame are integrally formed as a single piece plastic member, and the battery module further comprises multiple fasteners that secure the heatsink device, the primary retaining frame, the secondary retaining frame and the common electrodes together.

13. The battery module with high thermal conductivity according to claim 9, wherein the heatsink device comprises a resilient pad with high thermal conductivity.

14. The battery module with high thermal conductivity according to claim 9, further comprising a single conductive wire arranged in a zigzag form to electrically connect the top electrodes of the battery cells to the top common electrode.

15. The battery module with high thermal conductivity according to claim 9, further comprising a plurality of conductive wires, each electrically connecting one of the top electrodes of the battery cells to the top common electrode.

16. The battery module with high thermal conductivity according to claim 9, wherein the heatsink device includes a resilient material with one of: a carbon powder or a metallic powder.

17. The battery module with high thermal conductivity according to claim 9, wherein the heatsink device includes one of: rubber or silicone.

18. The battery module with high thermal conductivity according to claim 9, further comprising:

a metallic sheet secured to the secondary retaining frame, with the heatsink device between the metallic sheet and the bottom common electrode, wherein the heatsink device is forcibly deformed by pressurization.

19. The battery module with high thermal conductivity according to claim 9, further comprising:

thermal interfacial material between the heatsink device and one of: the top common electrode or the bottom common electrode.

20. The battery module with high thermal conductivity according to claim 9, wherein:

the primary retaining frame is an upper frame member;

the secondary retaining frame is a lower frame member; and the primary retaining frame and the secondary retaining frame have complementary mating latch members.

* * * * *